US008833424B2

(12) United States Patent
White

(10) Patent No.: US 8,833,424 B2
(45) Date of Patent: Sep. 16, 2014

(54) TIRE SPOON HOLDER AND METHOD OF OPERATION

(75) Inventor: Michael White, Montgomery City, MO (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 133 days.

(21) Appl. No.: 13/533,613

(22) Filed: Jun. 26, 2012

(65) Prior Publication Data

US 2013/0340948 A1    Dec. 26, 2013

(51) Int. Cl.
*B60C 25/132* (2006.01)
*B60C 25/02* (2006.01)
*B60C 25/14* (2006.01)
*B60C 25/00* (2006.01)
*B60C 25/04* (2006.01)
*B60C 25/01* (2006.01)
*B60C 25/05* (2006.01)
*B60C 25/135* (2006.01)
*B60C 25/128* (2006.01)
*B60C 25/13* (2006.01)
*B60C 25/125* (2006.01)

(52) U.S. Cl.
CPC .............. *B60C 25/02* (2013.01); *B60C 25/132* (2013.01); *B60C 25/025* (2013.01); *B60C 25/145* (2013.01); *B60C 25/00* (2013.01); *B60C 25/04* (2013.01); *B60C 25/01* (2013.01); *B60C 25/0548* (2013.01); *B60C 25/135* (2013.01); *B60C 25/128* (2013.01); *B60C 25/13* (2013.01); *B60C 25/125* (2013.01); *B60C 25/0563* (2013.01); *B60C 25/015* (2013.01); *B60C 25/16* (2013.01)

USPC .................... 157/1.17; 81/373; 81/420; D8/52

(58) Field of Classification Search
CPC .... B60C 25/02; B60C 25/132; B60C 25/025; B60C 25/145; B60C 25/00; B60C 25/04; B60C 25/01; B60C 25/0548; B60C 25/135; B60C 25/128; B60C 25/13; B60C 25/125; B60C 25/0653; B60C 25/015; B60C 25/16
USPC .......... 157/1, 1.17; 81/420, 424.5, 426, 426.5; 269/3, 6, 95, 143, 249
See application file for complete search history.

(56) References Cited

U.S. PATENT DOCUMENTS 179,533 A * 7/1876 Dewar .......................... 294/104
217,251 A * 7/1879 Weaver ........................... 81/420

(Continued)

OTHER PUBLICATIONS

International Search Report and Written Opinion dated Jan. 3, 2014 for PCT/US2013/47836 filed Jun. 26, 2013.

*Primary Examiner* — Lee D Wilson
*Assistant Examiner* — Melanie Alexander
(74) *Attorney, Agent, or Firm* — Baker & Hostetler LLP

(57) ABSTRACT

A tire spoon holder is provided. The tire spoon holder may include: a first and second handle; a first and second jaw, each jaw connected to at least one of the handles wherein the jaws are configured to come together when the handles are moved toward each other; and a loop attached to at least one jaw or handle. A method of attaching a tire spoon to a wheel rim may be provided. The method may include: attaching a tire spoon holder to a wheel rim; slipping a tire spoon through a loop in the tire spoon holder; and inserting a flat portion of the tire spoon between a tire and the wheel rim.

18 Claims, 3 Drawing Sheets

(56) References Cited

U.S. PATENT DOCUMENTS

| | | | |
|---|---|---|---|
| 2,679,779 A * | 6/1954 | Spikings | 81/373 |
| 3,118,965 A * | 1/1964 | Jones | 248/477 |
| 3,584,672 A | 6/1971 | Duquesne | |
| 3,746,069 A | 7/1973 | Blomgren, Sr. et al. | |
| 3,842,696 A | 10/1974 | Wayne | |
| 3,908,490 A | 9/1975 | Durham | |
| 4,386,542 A * | 6/1983 | Verna | 81/420 |
| 5,249,720 A * | 10/1993 | White | 223/112 |
| 5,339,507 A | 8/1994 | Cox | |
| D605,917 S * | 12/2009 | Sands | D8/52 |
| 2006/0025863 A1* | 2/2006 | Lamprich et al. | 623/17.16 |

* cited by examiner

TIRE SPOON HOLDER AND METHOD OF OPERATION

FIELD OF THE INVENTION

The present invention relates generally to tools used for removing tires from wheel rims. More particularly, the present invention relates to a tire spoon holder.

BACKGROUND OF THE INVENTION

Manual removal of tires from wheel rims has always been a challenging job. With the advent of new tire technology, including high performance tires and low profile tires that have tire side walls that are stiffer and are much shorter than they have historically been. Tire side walls are becoming increasingly stiff making what was always a challenging job even more challenging.

Tire spoons have long been used to assist in removing and installing tires and the wheel rims. Tire spoons are often long steel rods having a flat section on one end or, in some instances, either end.

Often, two tire spoons are used. In the first step, the mechanic will get one spoon inserted between the tire and rim and use that spoon to pry the tire edge over the rim. The mechanic will attempt to hold this first spoon in place while working and inserting a second spoon. Manipulating the second spoon often requires the use of two hands so in order to keep the first spoon in place the mechanic will often have to use a knee or legs in some fashion. Due to the awkwardness of a single mechanic attempting to operate two tire spoons, it is not usual for the first spoon to slip out of the mechanic's grasp thereby creating an undesirable situation.

Accordingly, it may be desirable to provide a method and/or an apparatus that can anchor or hold the first spoon in place and thereby allowing a mechanic to have his attention at operating the second tire spoon to remove the tire from the wheel rim.

SUMMARY OF THE INVENTION

The foregoing needs are met, to a great extent, by the present invention, wherein in one aspect an apparatus is provided that in some embodiments provides a method and apparatus that will hold a first tire spoon in place. Once the first tire spoon is held in place, the mechanic may apply his attention to the operation of the second tire spoon without having to hold the first tire spoon at the same time.

In accordance with one embodiment of the present invention, a tire spoon holder is provided. The tire spoon holder may include: a first and second handle; a first and second jaw, each jaw connected to at least one of the handles wherein the jaws are configured to come together when the handles are moved toward each other; and a loop attached to at least one jaw or handle.

In accordance with another embodiment of the present invention, a method of attaching a tire spoon to a wheel rim may be provided. The method may include: attaching a tire spoon holder to a wheel rim; slipping a tire spoon through a loop in the tire spoon holder; and inserting a flat portion of the tire spoon between a tire and the wheel rim.

In accordance with yet another embodiment of the present invention, a tire spoon holder is provided. The tire spoon holder may include: means for gripping; means for clamping wherein the means for clamping are configured to clamp when the means for gripping is closed; and means for attaching a tire spoon to the tire spoon holder.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
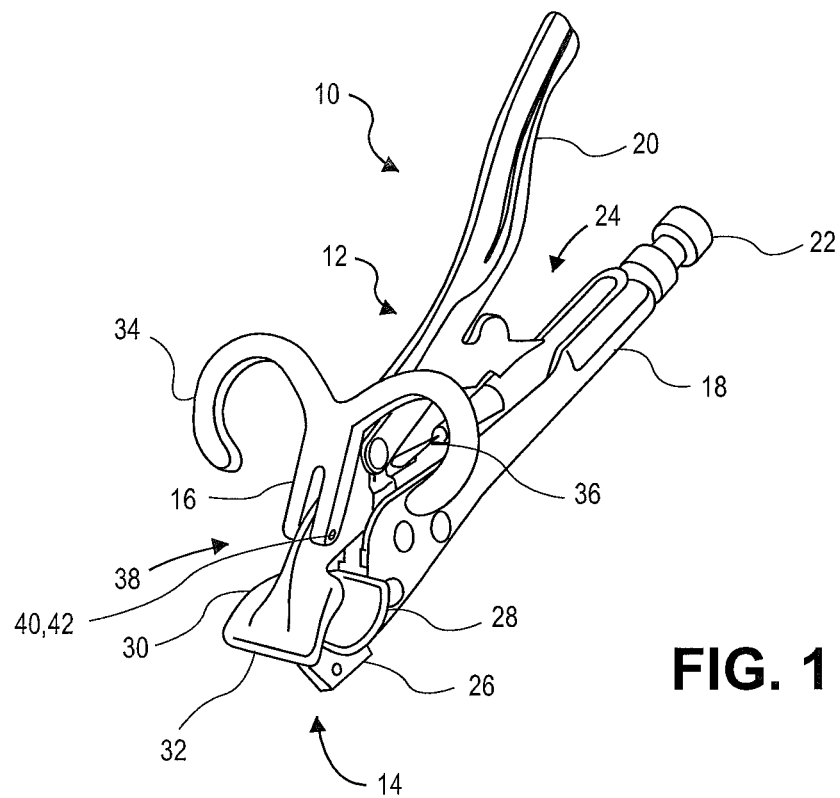
FIG. 1 is a perspective view illustrating a tire spoon holder according to an embodiment of the invention.

The invention will now be described with reference to the drawing figures, in which like reference numerals refer to like parts throughout. An embodiment in accordance with the present invention provides a tire spoon holder that will clamp to a wheel rim and provide a structure for a mechanic to secure a tire spoon to a wheel rim when the flat end of the tire spoon has been inserted between a wheel rim and a tire. The tire spoon holder will allow a mechanic to secure a first tire spoon to a wheel rim and tire and operate a second tire spoon without having to constantly hold the first tire spoon.

An embodiment in accordance with the invention, is illustrated in FIG. 1. The tire spoon holder 10 is illustrated. The tire spoon holder 10 may, in some embodiments of the invention, include a modified set of vice grip pliers 12. The tire spoon holder 10 may include jaws 14 and a tire spoon holding structure 16.

The tire spoon holder 10 may include a lower handle 18 and upper handle 20. The lower handle 18 may include an adjusting knob 22. The tire spoon holder 10 may include a locking structure 24. The tire spoon holder 10 may also include a lower jaw 26. The lower jaw 26 may, in some embodiments, include a curved lower jaw plate 28. The curved lower jaw plate 28 may be wider that the lower jaw 26 and curved in order to provide a better grip on a wheel rim which will be explained and illustrated in reference to FIG. 2 and FIG. 3 below.

The tire spoon holder 10 may also include an upper jaw 30. The upper jaw 30 may include a curved upper jaw plate 32. The curved upper jaw plate 32 may be wider than the upper jaw 30 and curved in order to provide a better surface for gripping a wheel rim as described and illustrated further below.

In some embodiments in accordance with the invention, either the upper jaw 30, the upper jaw curved plate 32 and/or the lower jaw 26 and lower jaw curved plate 28 may be coated with a resilient material. The resilient coating may reduce the likelihood of marring the finish on a wheel rim. In some embodiments in accordance with the invention, the resilient material may be or include rubber.

In some embodiments in accordance with the invention, the jaws 14 (with the exception of the curved lower jaw plate 28 and the curved upper jaw plate 32), the lower handle 18, the upper handle 20, the adjusting jaw 22 and the locking structure 24 operate in a manner similar to typical vice grip pliers 12. Typical vice grip pliers 12 are well known. As such their parts, subparts and operation of these features will not be described in further detail as these features are well known in the art.

In some embodiments of the invention, the upper jaw 30 may be dimensioned to have additional material in order to attach the tire spoon holding structure 16. Tire spoon holding structure 16 may include loop 34 and loop 36. As illustrated in FIG. 1, the loops 34 and 36 are located adjacent to each other. In some embodiments in accordance with the invention, the tire spoon holding structure 16 may include only a single loop. In other embodiments, multiple loops as illustrated may be used. The loops, 34 and 36, may be open loops as illustrated in the figures or in other embodiments of the invention closed loops may also be used.

While the tire spoon holder 10 may have two adjacent loops 34 and 36, as illustrated in FIG. 1 typically only one loop 34 or loop 36 may be preferred for use by a mechanic at a time. In some instances mechanics who may be right-handed or left-handed may prefer one loop over the other. Thus, the use of two loops 34 and 36 in a manner illustrated in FIG. 1 they make tire spoon holder 10 more user friendly for both left-handed and right-handed mechanics.

In some embodiments in accordance with the invention, the tire spoon holder 10 including the vice grip plier portion 12, the jaws 14 and the tire spoon holding structure 16 may be made of steel. An exception to this, may include the resilient material or rubber coating on the curved lower jaw plate 28, the curved upper jaw plate 32 and the lower jaw 26 and upper jaw 30. In some embodiments of the invention, not all of the upper jaw 30, lower jaw 26, curved law jaw 28 and curved upper jaw 32 may be rubber but only some of these features may be coated.

The tire spoon holding structure 16 is attached to the tire spoon holder pin by an attaching mechanism 38. The attaching mechanism 38 may include a hole 40 in the tire spoon holder and the upper jaw 30 and a pin 42 that passes through the hole 40 and the tire spoon holder pulling structure 16 and the upper jaw 30.

Figure 2:
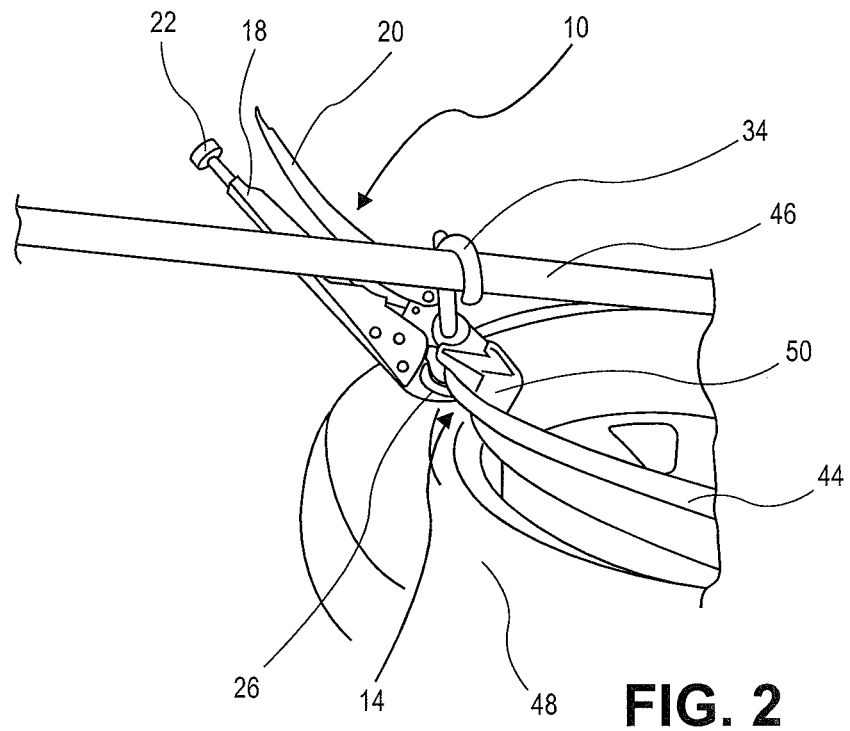
FIG. 2 is a perspective view of a tire spoon holder in accordance with an embodiment of the invention holding a tire spoon in place.

FIG. 2 illustrates a tire spoon holder 10 attached to a tire rim 44. A tire spoon holder 10 has a smaller or thinner lower jaw 26 and lacks the curved lower jaw plate 28 shown in FIG. 1. However, in some applications and it may be desirable to have the curved lower jaw plate 28, as shown in FIG. 1 to better attach to the rim 44.

A tire spoon 46 is illustrated extending through the loop 34 of a tire spoon holder 10. The tire spoon holder 10 is shown with the lower handle 18 moved toward the upper handle 20, thereby tightening the jaws 14. The adjusting knob 22 has been adjusted so that position of the jaws 14 are locked and the tire spoon holder 10 is locked to the tire rim 44. The tire 48 is shown removed from the tire rim 44 in order to better illustrate how the jaws 14 are locked onto the tire rim 44. In the embodiment shown in FIG. 2, the tire spoon holder 10 has a thickened upper jaw 50 which permits the tire spoon holder 10 to better attach to the tire rim 44. However, in other embodiments as shown in FIG. 1 rather than a thickened upper jaw 50 a curved upper jaw plate 32 may also be employed.

Figure 3:
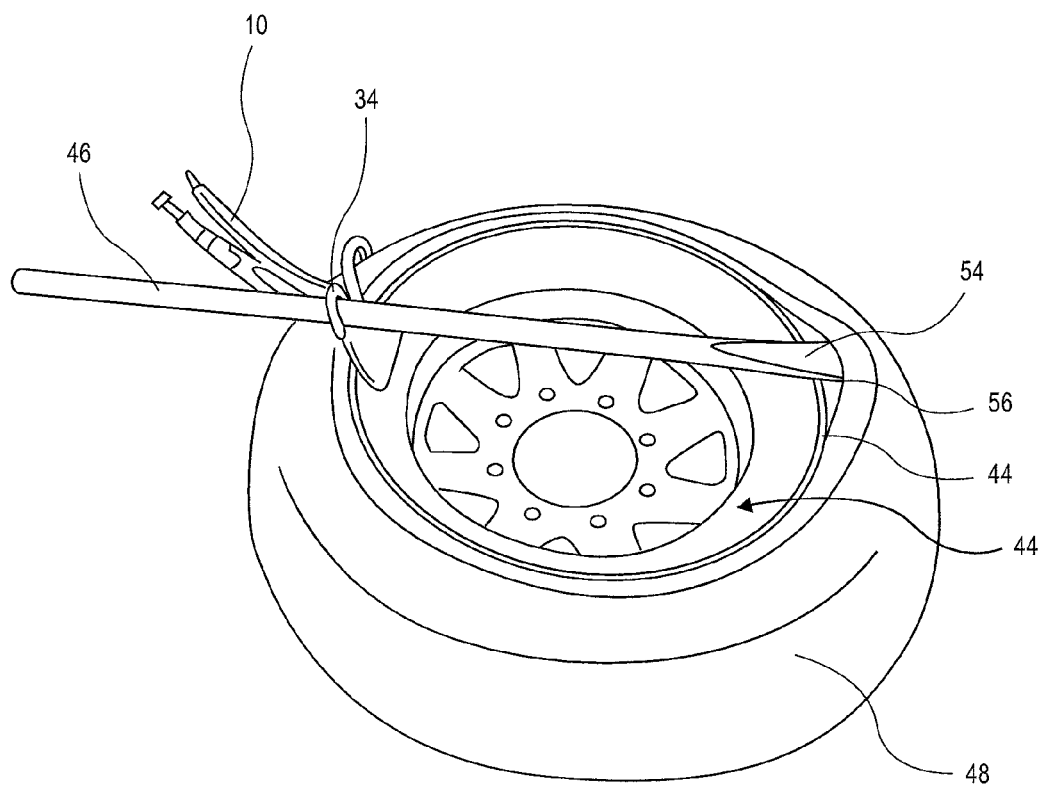
FIG. 3 is a perspective view of a tire spoon holder holding a tire spoon in place where the tire spoon has been inserted between the tire and the wheel rim.

FIG. 3 illustrates the tire spoon holder 10 attached to the tire rim 44. A tire spoon 46 is extending through the loop 34 of the tire spoon holder 10. The wheel 52 includes a tire rim 44 and the tire 48. A flat end of the 54 of the tire spoon 46 is shown to be located in between the tire rim 44 and the side wall 56 of the tire 48. The tire spoon 46 is manipulated so that it extends between the tire rim 44 and side wall 56 of the tire 48 as shown in FIG. 3. Then the tire spoon holder 10 may be attached to the tire spoon 46 by fitting the loop 34 or 36 over the back end of the tire spoon 46. The tire spoon holder 10 may then be slid along the tire spoon 46 to a desired position. The tire spoon holder 10 may be then be clamped or attached to the tire rim 44 as shown in FIG. 3.

In some embodiments, a second tire spoon may then be used by a mechanic to move the tire 48 off of a tire rim 44.

Figure 4:
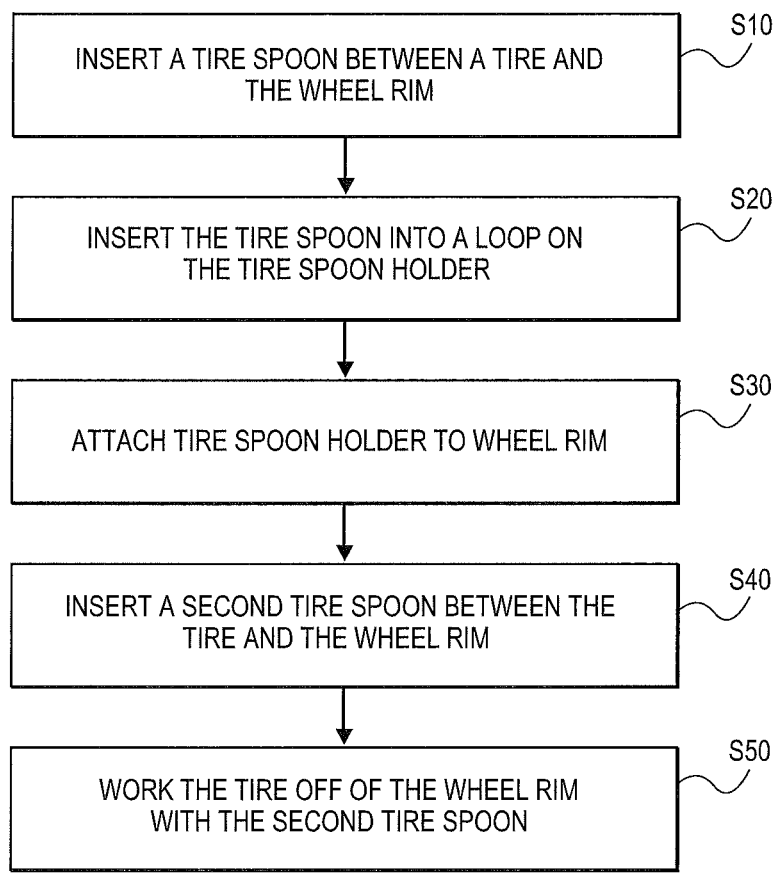
FIG. 4 is a flow chart illustrating steps used in operation of the tire spoon holder.

FIG. 4 illustrates steps that may be used by a mechanic to use the attachment holder to remove a tire from a tire rim. The steps illustrated in FIG. 4 may not necessarily be done in the order described, they can be done in any suitable order.

At step S10 a mechanic may insert a tire spoon between a tire and the wheel rim. At step S20 be the mechanic may insert the tire spoon into a loop on the tire spoon holder. At step S30 the mechanic may attach the spoon holder to a wheel rim. At step S40 the mechanic may insert a second tire spoon between the tire and the wheel rim. At step S50 the mechanic may work the tire off of the wheel rim with its second tire spoon.

The above-described method may provide some advantages in that once the first tire spoon is located between the tire rim and the tire and has been attached to a tire spoon holder and the tire spoon holder is attached to the wheel rim the first tire spoon may be held in place and provide an opening for the mechanic to easily insert the second tire spoon between the tire and the wheel rim and work the tire off of the wheel rim. In some embodiments of the invention, attaching the tire spoon holder to wheel rim, may include adjusting the adjusting knob so the jaws will lock onto the wheel rim.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tire spoon holder comprising:
   a lower and an upper handle;
   a lower and upper jaw, each jaw connected to at least one of the handles wherein the jaws are configured to come together when the handles are moved toward each other; and a first and a second loop attached to the upper or lower jaw, wherein the first and second loop are open and adjacent to each other.

2. The tire spoon holder of claim 1, further comprising a locking structure configured to lock the jaws at a position and an adjusting knob configured to adjust the position of where the jaws lock.

3. The tire spoon holder of claim 2, wherein the handles, jaws, locking structure and adjusting knob are in the form of vice grip pliers.

4. The tire spoon holder of claim 1, further comprising a curved plate attached to at least one of the jaws.

5. The tire spoon holder of claim 4, wherein the curved plate is wider than the jaws.

6. The tire spoon holder of claim 1, further comprising a resilient coating on at least one jaw.

7. The tire spoon holder of claim 6, wherein the coating is rubber.

8. The tire spoon holder of claim 1, wherein the tire spoon holder including the loops are primarily made of steel.

9. The tire spoon holder of claim 1, wherein the loops are pivotally connected to one of the jaws.

10. The tire spoon holder of claim 1, wherein the loops are fixed with respect to one of the jaws.

11. The tire spoon holder of claim 1, wherein the loops are dimensioned to allow a shaft portion of a tire spoon to pass through the loops.

12. A tire spoon holder comprising:
means for gripping;
means for clamping configured to move toward each other to clamp when the means for gripping is closed by being moved toward each other; and
a first and a second loop attached to the means for clamping, wherein the first and second loop are open and adjacent to each other.

13. A method of attaching a tire spoon to a wheel rim comprising:
attaching a tire spoon holder, having a first and a second loop that is open and adjacent to each other, to a wheel rim;
slipping a tire spoon through the first or second loop in the tire spoon holder; and
inserting a flat portion of the tire spoon between a tire and the wheel rim.

14. The method of claim 13, further comprising adjusting a locking structure on the tire spoon holder.

15. The method of claim 13, further comprising slipping a second tire spoon between the tire and the wheel rim.

16. The method of claim 15, further comprising working the second tire spoon to remove the tire from the wheel rim.

17. The method of claim 13, further comprising locking the tire spoon holder to the rim by operating a vice grip portion of the tire spoon holder.

18. The method of claim 13, further comprising selecting which of two loops on the tire spoon holder to insert the tire spoon through.

* * * * *